US012654501B1

(12) United States Patent
Pankratov

(10) Patent No.: US 12,654,501 B1
(45) Date of Patent: Jun. 16, 2026

(54) ADJUSTABLE TRAILER HITCH ASSEMBLY

(71) Applicant: Oleksandr Pankratov, Mislata (ES)

(72) Inventor: Oleksandr Pankratov, Mislata (ES)

(73) Assignee: Gossip LLC, Sheridan, WY (US)

( * ) Notice: Subject to any disclaimer, the term of this patent is extended or adjusted under 35 U.S.C. 154(b) by 0 days.

(21) Appl. No.: 19/543,918

(22) Filed: Feb. 19, 2026

(51) Int. Cl.
*B60D 1/46* (2006.01)
*B60D 1/04* (2006.01)
*B60D 1/07* (2006.01)

(52) U.S. Cl.
CPC .................. *B60D 1/46* (2013.01); *B60D 1/04* (2013.01); *B60D 1/07* (2013.01)

(58) Field of Classification Search
CPC ....................................................... B60D 1/46
See application file for complete search history.

(56) References Cited

U.S. PATENT DOCUMENTS

| | | | |
|---|---|---|---|
| 7,857,344 B2 | 12/2010 | Hensley | |
| 10,857,846 B1 | 12/2020 | Jacobs | |
| D924,108 S * | 7/2021 | Works | D12/162 |

| | | | | |
|---|---|---|---|---|
| D934,741 S | * | 11/2021 | Mueller | D12/162 |
| D934,742 S | * | 11/2021 | McCall | D12/162 |
| D947,079 S | * | 3/2022 | Chen | D12/162 |
| D951,825 S | * | 5/2022 | Borkholder | D12/162 |
| D967,741 S | * | 10/2022 | Wyers | D12/162 |
| 11,660,916 B2 | | 5/2023 | Singh et al. | |
| 12,447,780 B1 * | | 10/2025 | Luo | B60D 1/06 |
| 2025/0018753 A1 * | | 1/2025 | Shaffer | B60D 1/06 |
| 2025/0381810 A1 * | | 12/2025 | Wei | B60D 1/07 |
| 2025/0388054 A1 * | | 12/2025 | Chen | B60D 1/06 |
| 2026/0008306 A1 * | | 1/2026 | Wei | B60D 1/46 |

FOREIGN PATENT DOCUMENTS

AU       2018202785 B2 *  8/2019  ............. B60D 1/583

* cited by examiner

*Primary Examiner* — Kevin Hurley

(57) ABSTRACT

An adjustable trailer hitch assembly includes a shank configured for insertion into a vehicle receiver and a channel member extending from the shank. A ball mount is receivable within the channel member and is selectively positionable at different vertical heights. The channel member includes a plurality of longitudinal guide members, and the ball mount includes a non-circular body having a plurality of longitudinal slots configured to receive the guide members. Engagement between the guide members and the slots constrains the ball mount against rotational movement relative to the channel member while permitting removal and reinsertion of the ball mount in selected angular orientations. A transverse pin retains the ball mount at a selected height and angular orientation within the channel member.

13 Claims, 6 Drawing Sheets

ADJUSTABLE TRAILER HITCH ASSEMBLY

BACKGROUND OF THE INVENTION

1. The Field of the Invention

The present invention relates generally to trailer hitch assemblies for towing vehicles. More particularly, the invention relates to adjustable trailer hitch assemblies having a ball mount that is selectively positionable and orientable relative to a hitch receiver, and to structural interfaces that constrain rotational movement of the ball mount while permitting vertical adjustment and reorientation of the ball mount when removed from the hitch assembly.

2. Background

Trailer hitch assemblies are widely used to couple trailers and other towed implements to a towing vehicle. Many vehicles utilize a receiver-style hitch, into which a shank of a trailer hitch assembly is inserted and secured by a transverse pin. The hitch assembly typically carries a ball mount providing one or more towing interfaces, such as hitch balls of different sizes or other coupling elements.

Adjustable trailer hitches have been developed to allow the height of the ball mount to be adjusted relative to the receiver in order to accommodate trailers with different tongue heights. In many known adjustable hitch designs, the ball mount is received within a vertically extending channel and is secured at a selected height by one or more transverse pins passing through aligned apertures in the channel and the ball mount.

In conventional adjustable hitch assemblies, the transverse pin commonly serves as the primary structural element resisting rotational and torsional loads applied to the ball mount during towing. As a result, towing forces are largely transmitted through the pin in shear and bearing, which can lead to wear, deformation, looseness, noise, and reduced durability over time. Such pin-centric load paths may also limit the stability of the connection under dynamic towing conditions.

Some hitch designs attempt to address these issues by using external clamps, brackets, or ball mounts that partially wrap around the channel or shank. While such designs may reduce relative movement, they often increase complexity, restrict the ability to reorient the ball mount, or limit the number of usable towing interfaces. In particular, certain known designs allow the ball mount to be oriented in only two angular positions, thereby restricting the number of distinct towing interfaces that can be practically used on a single ball mount body.

Accordingly, there remains a need for an adjustable trailer hitch assembly that provides improved resistance to rotational and torsional loads, reduces reliance on shear-loaded pins as the primary torque-bearing elements, and permits a ball mount to be selectively oriented in multiple discrete angular positions while maintaining a simple, robust, and durable structure.

SUMMARY

The present invention relates to an adjustable trailer hitch assembly that allows selective adjustment of both hitch height and towing interface orientation.

The assembly includes a shank configured for insertion into a vehicle receiver and a channel member extending from the shank. A ball mount is receivable within the channel member and is selectively positionable at different vertical heights.

The channel member includes a plurality of longitudinal guide members, and the ball mount includes a non-circular body having a plurality of longitudinal slots configured to receive the guide members. Engagement between the guide members and the slots constrains the ball mount against rotational movement while permitting insertion, removal, and repositioning of the ball mount.

The ball mount is removable and reinsertable in a selected angular orientation to present different towing interfaces. A transverse pin is receivable through aligned apertures to retain the ball mount at a selected height and angular orientation within the channel member.

DETAILED DESCRIPTION

Figure 1:
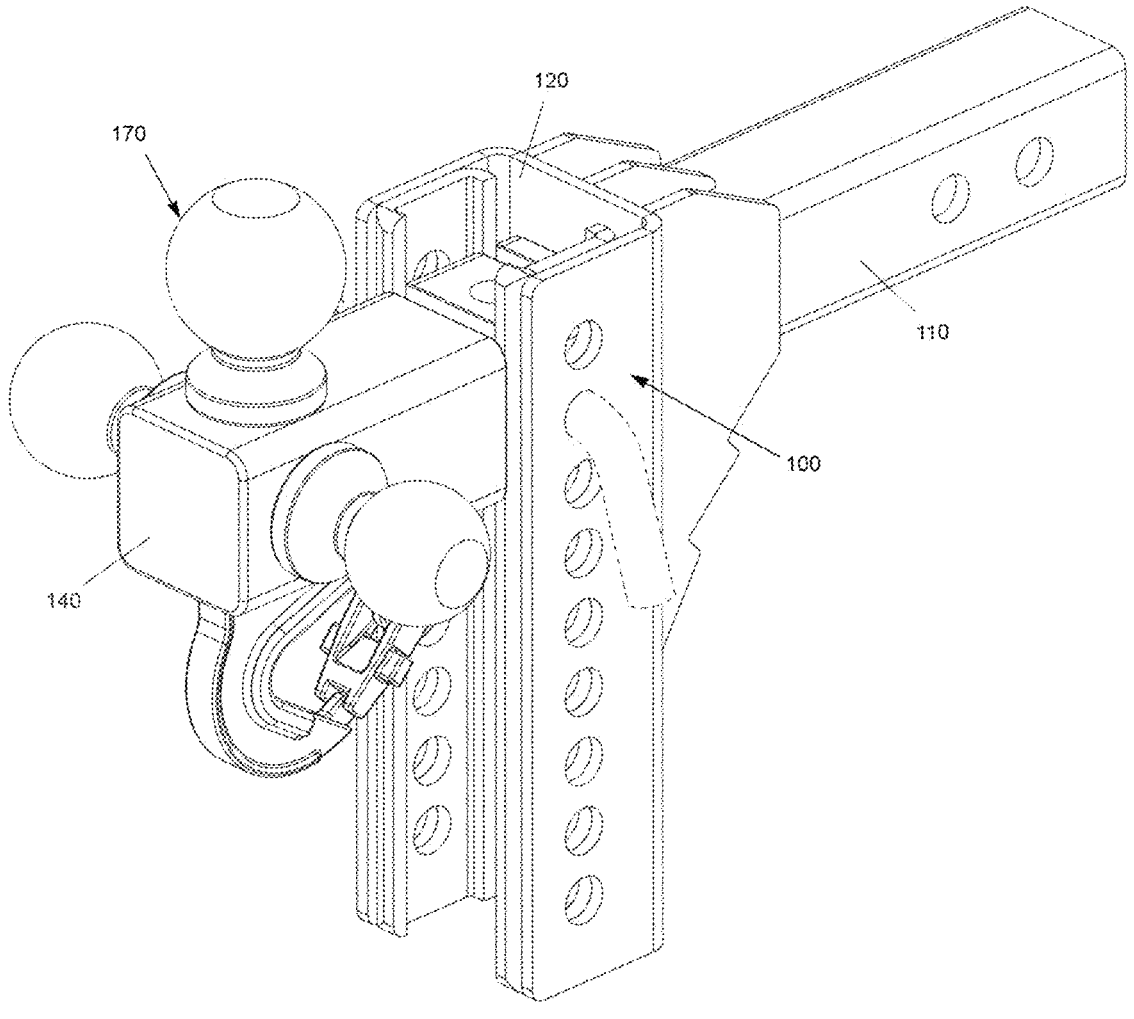
FIG. 1 is a perspective view of an adjustable trailer hitch assembly according to one embodiment of the invention.
Figure 2:
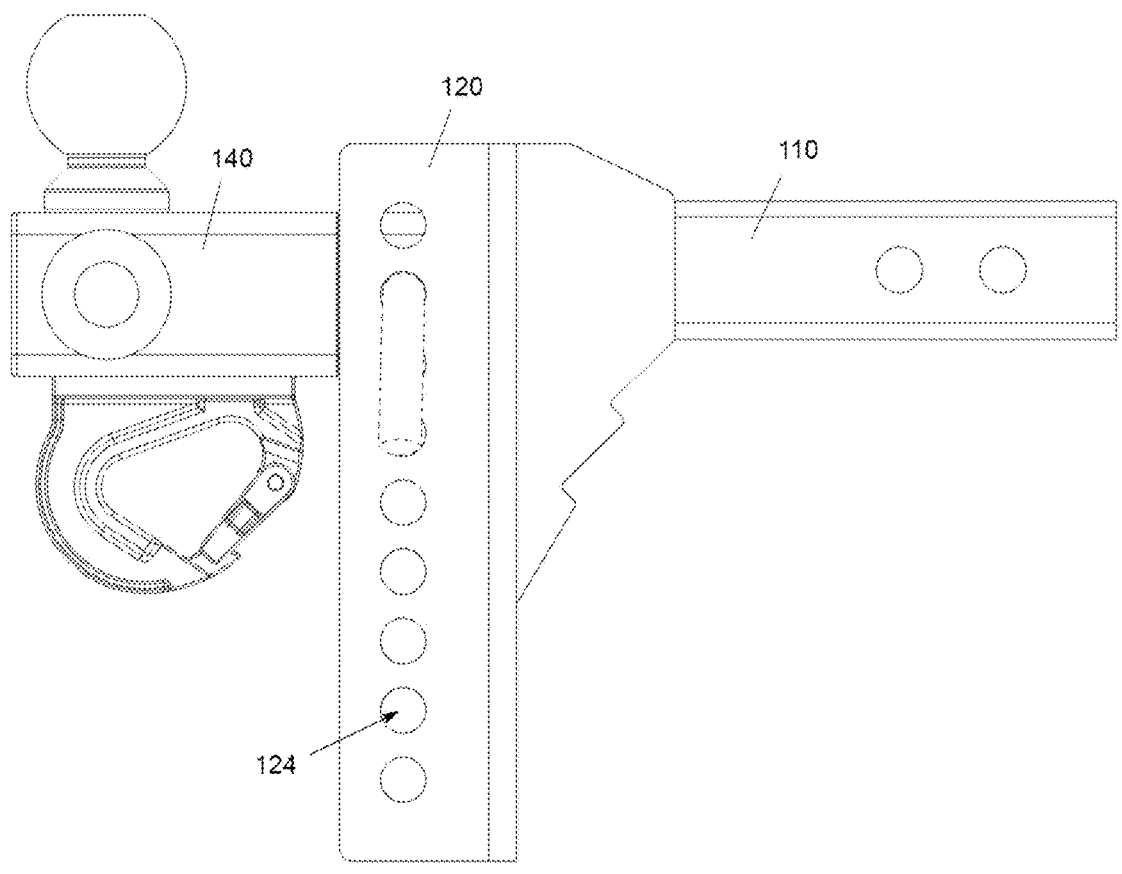
FIG. 2 is a side elevation view of the adjustable trailer hitch assembly showing vertical adjustment of a ball mount relative to a channel member.
Figure 3:
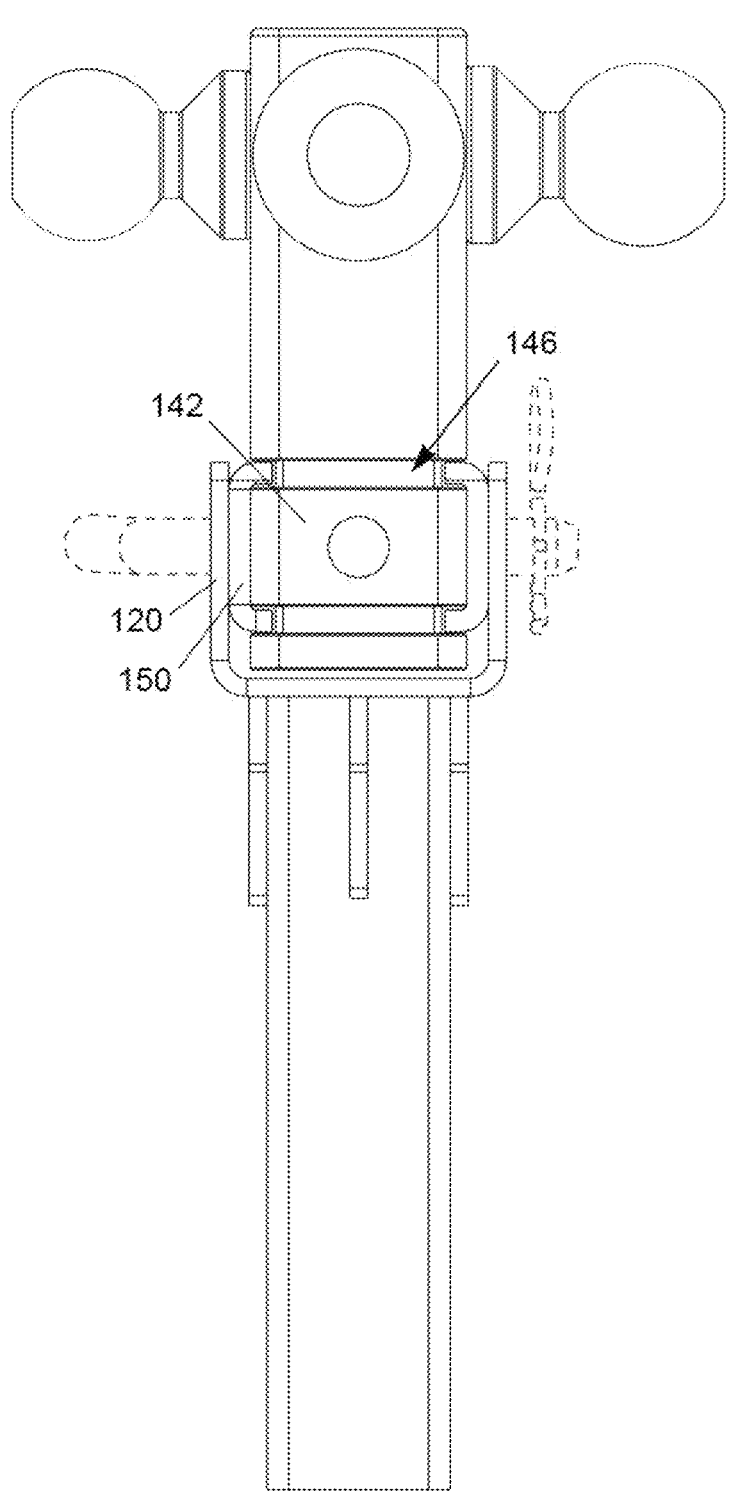
FIG. 3 is a top plan view of the adjustable trailer hitch assembly illustrating engagement between longitudinal guide members of the channel member and longitudinal slots of the ball mount to constrain rotational movement.
Figure 4:
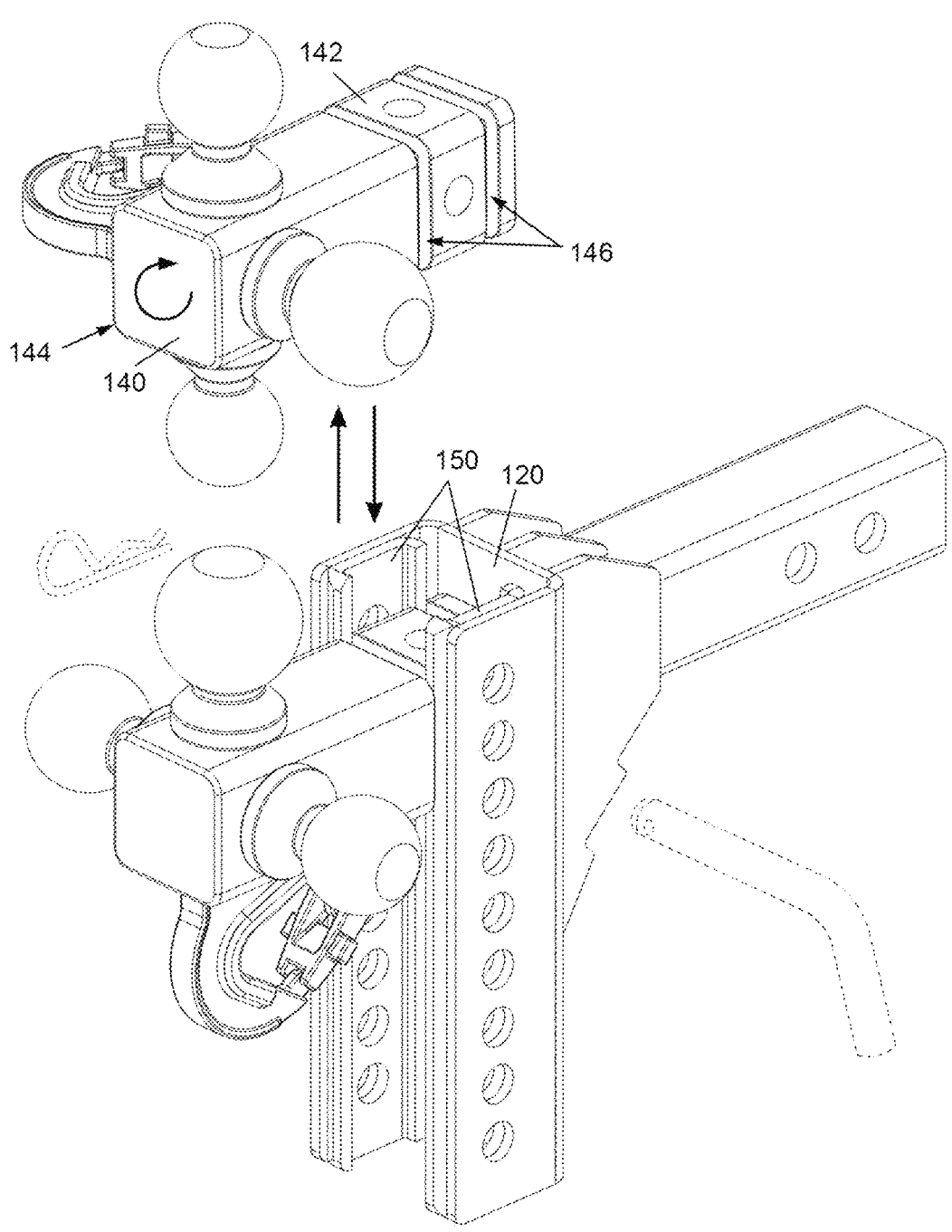
FIG. 4 is an exploded perspective view illustrating removal of the ball mount from the channel member and reinsertion of the ball mount in a selected angular orientation.
Figure 5:
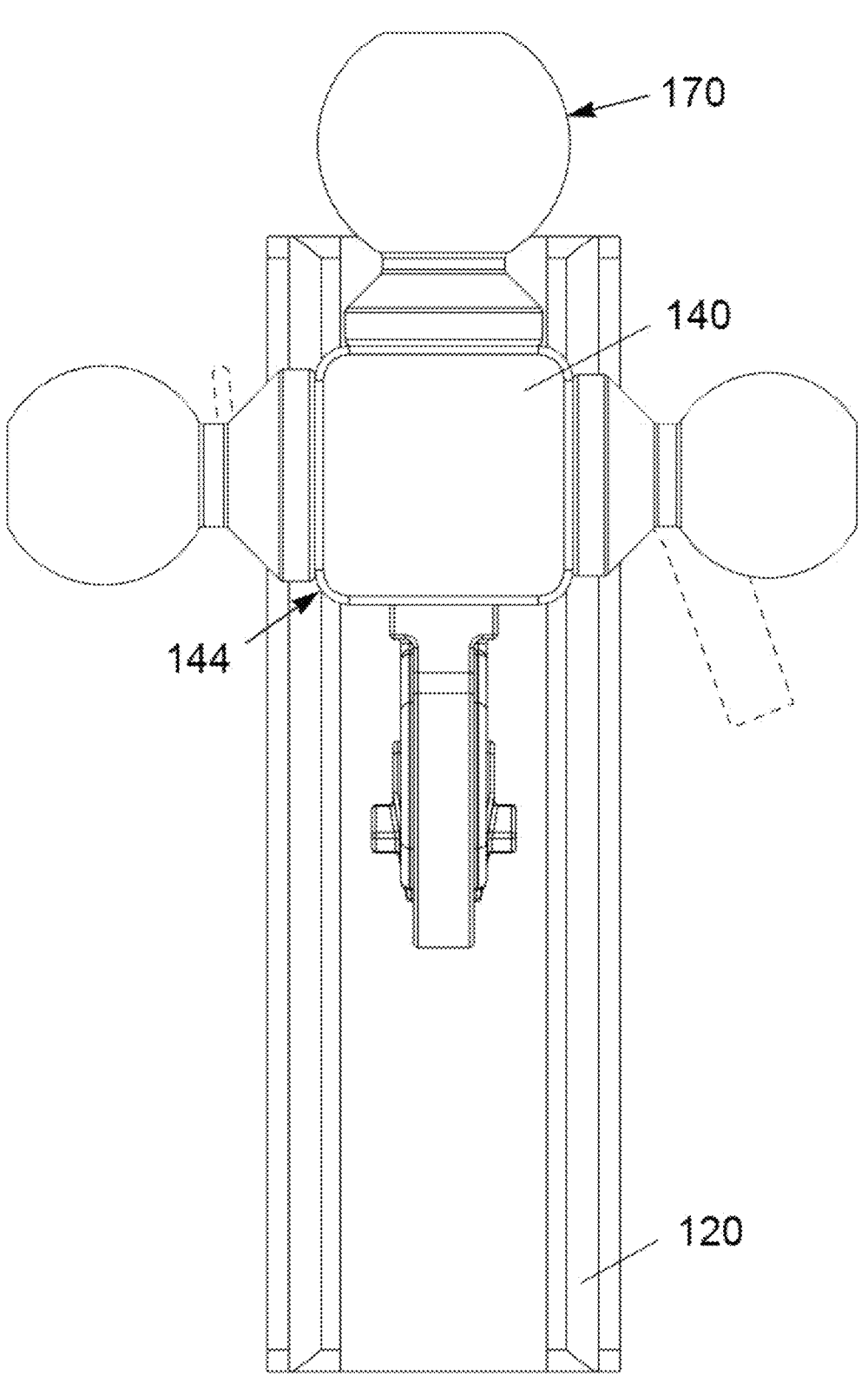
FIG. 5 is an end elevation view of the ball mount illustrating a polygonal cross-section of the ball mount body that defines a plurality of discrete angular orientations when received within the channel member.
Figure 6:
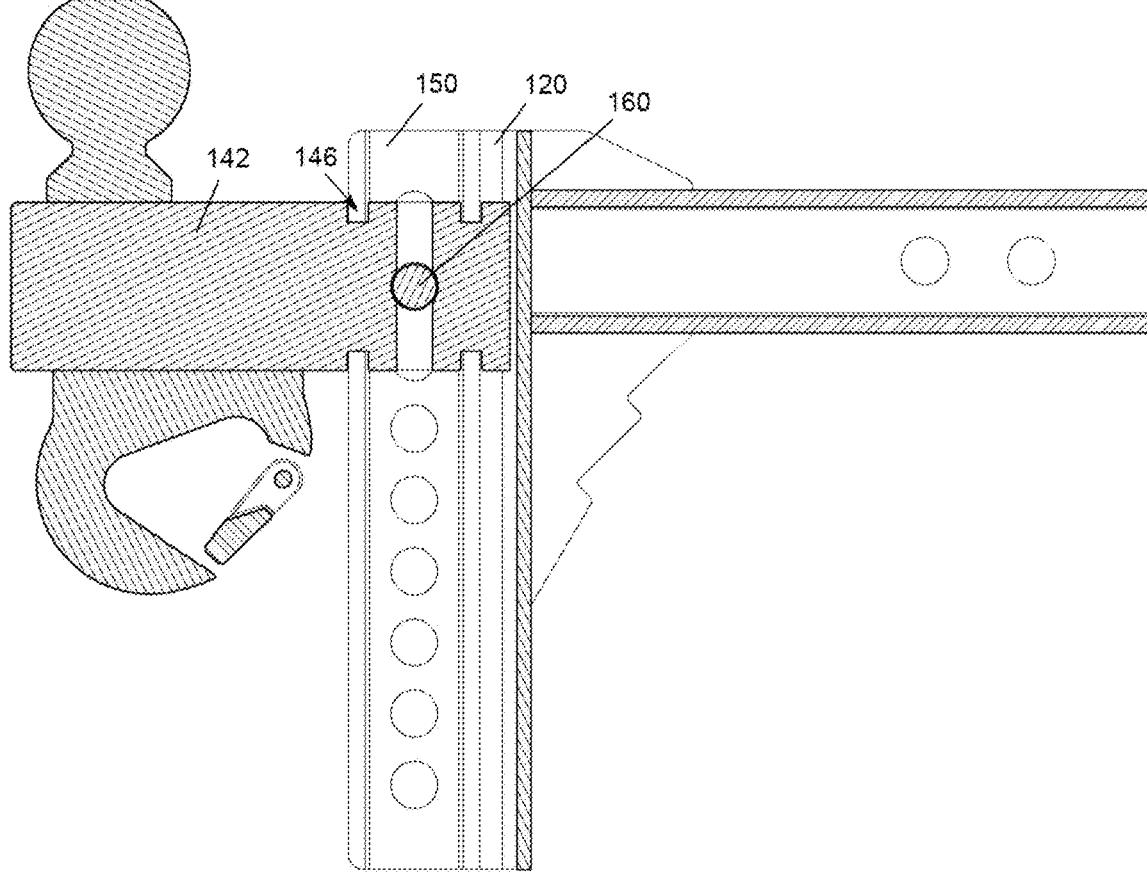
FIG. 6 is a side elevation view, partially in section, illustrating internal engagement of the longitudinal guide members with the longitudinal slots and retention of the ball mount by a transverse pin.

Referring to the drawings, wherein like reference numerals designate like elements throughout, an adjustable trailer hitch assembly 100 is illustrated.

The adjustable trailer hitch assembly 100 includes a shank 110 configured for insertion into a receiver of a towing vehicle. The shank 110 may include one or more transverse apertures for receiving a hitch pin to secure the shank 110 within the receiver in a conventional manner. A channel member 120 is fixed relative to the shank 110 and extends generally vertically from the shank 110.

The channel member 120 includes a plurality of longitudinal guide members 150 extending generally in a vertical direction. In some embodiments, the longitudinal guide members 150 are formed as separate elements secured to the channel member 120, such as by welding. In other embodiments, the longitudinal guide members 150 are integrally formed with the channel member 120, such as by casting, forging, machining, or additive manufacturing. Regardless of the manufacturing method, the longitudinal guide members 150 are rigidly fixed relative to the channel member 120 and define a non-movable, load-transferring structure.

As used herein, the term "plurality of longitudinal guide members" is not limited to physically separate components. In some embodiments, a single unitary guide structure fixed relative to the channel member may define multiple longitudinal guide portions, guide surfaces, ribs, or engagement regions configured to engage corresponding longitudinal slots of the ball mount body and to constrain rotational movement of the ball mount relative to the channel member. Such unitary guide structures are considered to include a plurality of longitudinal guide members as described herein.

In one embodiment, each longitudinal guide member 150 includes a pair of spaced guide ribs extending generally in the vertical direction. The guide ribs define a space therebetween.

The adjustable trailer hitch assembly 100 further includes a ball mount 140 receivable within the channel member 120. The ball mount 140 includes a ball mount body 142 having a non-circular, polygonal cross-section 144. The polygonal cross-section 144 defines a plurality of discrete angular orientations of the ball mount 140 relative to the channel member 120.

The ball mount body 142 includes a plurality of longitudinal slots 146 formed along the length of the ball mount body 142. The longitudinal slots 146 are configured to receive the longitudinal guide members 150 such that engagement between the longitudinal guide members 150 and the longitudinal slots 146 constrains the ball mount 140 against rotational movement relative to the channel member 120 while permitting insertion, removal, and vertical repositioning of the ball mount 140 relative to the channel member 120.

In certain embodiments, in which each longitudinal guide member 150 includes a pair of guide ribs, the ball mount body 142 includes a corresponding pair of longitudinal slots 146 on each side of the polygonal cross-section 144, each longitudinal slot configured to receive a respective guide rib.

The ball mount body 142 further includes one or more transverse apertures extending through the ball mount body 142 between the longitudinal slots 146. The channel member 120 includes one or more transverse apertures 124 positioned between the guide ribs of the longitudinal guide members 150. In addition, the longitudinal guide members 150 include transverse apertures aligned with the transverse apertures of the channel member 120 and the ball mount body 142.

A transverse pin 160 is receivable through the aligned transverse apertures of the channel member 120, the longitudinal guide members 150, and the ball mount body 142 to retain the ball mount 140 at a selected vertical position relative to the channel member 120.

In some embodiments, corresponding transverse apertures are provided on multiple sides of the ball mount body 142 to permit retention of the ball mount 140 in a plurality of discrete angular orientations relative to the channel member 120 by insertion of the transverse pin 160 through aligned apertures.

The ball mount 140 is removable from the channel member 120 and reinsertable in a selected angular orientation relative to the channel member 120 to present different towing interfaces 170. The towing interfaces 170 may include one or more hitch balls of different sizes, a hook, or other towing accessories formed on or attached to the ball mount body 142.

During towing, torsional and anti-rotation loads acting on the ball mount 140 are primarily transferred through bearing engagement between the longitudinal guide members 150 and the longitudinal slots 146, thereby defining a primary torque load path between the ball mount 140 and the channel member 120. The transverse pin 160 functions primarily as a retention element and as a secondary load-sharing component, carrying residual loads due to clearance, tolerances, and dynamic loading conditions.

By shifting the primary anti-rotation and torque-bearing function from the transverse pin 160 to the internal guide-and-slot interface, the adjustable trailer hitch assembly 100 reduces wear, play, and fatigue associated with pin-centric adjustable hitch designs, while enabling stable towing and convenient adjustment using a single ball mount body.

What is claimed is:

1. An adjustable trailer hitch assembly comprising:
a shank configured for insertion into a receiver of a vehicle;
a channel member fixed to the shank and extending generally vertically;
a ball mount receivable within the channel member;
a plurality of longitudinal guide members fixed relative to the channel member and extending generally in a vertical direction;
the ball mount having a non-circular body defining a plurality of longitudinal slots configured to receive the plurality of longitudinal guide members,
wherein engagement between the plurality of longitudinal guide members and the plurality of longitudinal slots constrains the ball mount against rotational movement relative to the channel member while permitting insertion, removal, and vertical repositioning of the ball mount; and
a transverse pin receivable through aligned apertures of the channel member and the ball mount to retain the ball mount at a selected vertical position and angular orientation within the channel member.

2. The adjustable trailer hitch assembly of claim 1, wherein the non-circular body of the ball mount defines a polygonal cross-section providing a plurality of discrete angular orientations.

3. The adjustable trailer hitch assembly of claim 2, wherein the polygonal cross-section provides at least four discrete angular orientations.

4. The adjustable trailer hitch assembly of claim 1, wherein engagement of the plurality of longitudinal guide members with the plurality of longitudinal slots provides a primary constraint against rotational movement of the ball mount relative to the channel member.

5. The adjustable trailer hitch assembly of claim 1, wherein the ball mount is removable from the channel member and reinsertable in a selected angular orientation relative to the channel member.

6. The adjustable trailer hitch assembly of claim 1, wherein the transverse pin is the only fastener retaining the ball mount within the channel member during use.

7. The adjustable trailer hitch assembly of claim 1, wherein engagement of the plurality of longitudinal guide members with the plurality of longitudinal slots establishes alignment of the ball mount relative to the channel member prior to insertion of the transverse pin.

8. The adjustable trailer hitch assembly of claim 1, wherein torsional loads generated during towing are primarily transferred between the ball mount and the channel member through engagement of the plurality of longitudinal guide members with the plurality of longitudinal slots, and wherein the transverse pin provides a secondary load-sharing function.

9. The adjustable trailer hitch assembly of claim 1, wherein the plurality of longitudinal guide members define a wear interface configured to accommodate repeated insertion, removal, and towing loads.

10. The adjustable trailer hitch assembly of claim 1, wherein the ball mount carries a plurality of towing interfaces.

11. The adjustable trailer hitch assembly of claim 1, wherein each longitudinal guide member includes a pair of guide ribs, and wherein the ball mount includes a corresponding pair of longitudinal slots on each side of the non-circular body.

12. The adjustable trailer hitch assembly of claim 11, wherein the transverse pin is receivable through aligned apertures of the channel member, the plurality of longitudinal guide members, and the ball mount, and is positioned between the pair of guide ribs.

13. The adjustable trailer hitch assembly of claim 1, wherein the plurality of longitudinal guide members comprises two longitudinal guide members.

\* \* \* \* \*